(12) United States Patent
Anderson

(10) Patent No.: US 6,963,965 B1
(45) Date of Patent: Nov. 8, 2005

(54) INSTRUCTION-PROGRAMMABLE PROCESSOR WITH INSTRUCTION LOOP CACHE

(75) Inventor: Timothy D. Anderson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 466 days.

(21) Appl. No.: 09/713,731

(22) Filed: Nov. 15, 2000

Related U.S. Application Data

(60) Provisional application No. 60/168,260, filed on Nov. 30, 1999.

(51) Int. Cl.[7] ............................. G06F 15/78; G06F 9/44
(52) U.S. Cl. ........................... 712/33; 712/42; 712/233
(58) Field of Search .............................. 712/24, 33, 35, 712/42, 233

(56) References Cited

U.S. PATENT DOCUMENTS

| | | | |
|---|---|---|---|
| 4,626,988 A | 12/1986 | George | 364/200 |
| 5,579,493 A | 11/1996 | Kiuchi et al. | 395/375 |
| 5,600,583 A | 2/1997 | Bosshart et al. | 364/736.5 |
| 5,893,142 A | 4/1999 | Moyer et al. | 711/125 |
| 5,920,890 A | 7/1999 | Moyer et al. | 711/144 |
| 5,951,679 A | 9/1999 | Anderson et al. | |
| 6,085,315 A * | 7/2000 | Fleck et al. | 712/241 |
| 6,125,440 A * | 9/2000 | Osovets | 712/205 |

OTHER PUBLICATIONS

Computer Organization and Design—The Hardware/Software Interface, 2nd Edition, John L. Hennessy and David A. Patterson, Morgan Kaufman Publishers, 1998; pp. 542, 545, 549, and 579 The Basic Caches.*
The Authoritative Dictionary of IEEE STandards Terms, 2000, IEEE Press, 7th Edition, p. 629.*

* cited by examiner

Primary Examiner—Daniel H. Pan
(74) Attorney, Agent, or Firm—Robert D. Marshall, Jr.; W. James Brady, III; Frederick J. Telecky, Jr.

(57) ABSTRACT

An instruction-programmable processor, such as a digital signal processor, having a level one program cache memory and instruction buffer subsystem, is disclosed. The subsystem includes a loop cache subsystem that includes a branch cache register file for storing instruction opcodes corresponding to a sequence of fetch addresses beginning with a base address. If the fetch address issued by the instruction fetch unit is a hit relative to the loop cache subsystem loop cache control logic disables reads from program data RAM in favor of accesses to the branch cache register file. The branch cache register file can be loaded with opcodes beginning with each backward branch that is a miss relative to the branch cache register file and can be loaded with opcodes beginning with backward branches that are a miss relative to the branch cache register file and that have been executed twice in succession.

16 Claims, 5 Drawing Sheets

INSTRUCTION-PROGRAMMABLE PROCESSOR WITH INSTRUCTION LOOP CACHE

CROSS-REFERENCE TO RELATED APPLICATIONS

This application claims priority under 35 USC §119(e)(1) of Provisional Application No. 60/168,260, filed Nov. 30, 1999.

Not applicable.

STATEMENT REGARDING FEDERALLY SPONSORED RESEARCH OR DEVELOPMENT

Not applicable.

BACKGROUND OF THE INVENTION

This invention is in the field of integrated circuits, and is more specifically directed to microprocessor and digital signal processor architecture.

As is well known in the art, advances in integrated circuit manufacturing technology, and in circuit design and architecture, have enabled the widespread deployment of instruction-programmable logic devices in a wide range of electronic systems. The scope of modern digital systems ranges in size from hand held systems, such as wireless telephones and personal digital assistants (PDAs), to large-scale computer systems, and ranges in functionality from embedded control devices to supercomputing applications. The programmable logic devices included in such systems may be general purpose devices, such as microprocessors, or devices that are particularly suited for certain types of instruction execution, such as digital signal processors (DSPs); for purposes of the following description, devices of these types will be referred to generically as central processing units, or CPUs.

As is fundamental in the art, CPUs are implemented in connection with random access memory (RAM) for the storage of data operands and results, and also for the storage of the program instructions that direct the desired data processing. In relatively large and complex systems, the necessary memory resources require the use of external RAM (relative to the CPU), considering that on-chip memory resources are necessarily quite limited. Of course, the use of external memory generally results in reduced performance because of the overhead operations that are required for external memory access, and because of bandwidth limitations in the communication of data between external memory and the CPU. Additionally, the power consumed in the use of external memory is typically much greater than that required by on-chip memory in the CPU, primarily due to inter-chip signal driving requirements.

As a result, many modern microprocessor and DSP architectures now utilize cache memory systems to improve the performance and reduce the power consumption of the overall system. Fundamentally, cache memories are implemented by way of small high-speed memories that are "closer" to the CPU both physically (i.e., on-chip, or connected by way of a special short range bus such as a "backside" cache bus) and logically (i.e., not requiring the use of general interface circuitry, bus mastering, and the like). The cache memory stores data and instruction codes for which the CPU has a relatively high likelihood of accessing, based on certain assumptions. For example, many cache memories rely on an assumption that data operands and instruction opcodes are often accessed in sequence, in which case the associated CPU loads cache memories in blocks (i.e., cache lines) based upon a fetched memory address. Accesses to cache are typically carried out by the CPU comparing the memory address of a data operand or instruction to be fetched with the addresses of the current entries in the cache, to determine whether the target of the fetch may be retrieved from the cache or must instead be accessed from the external memory. Many strategies for the storage, access, and updating of cache memories, as well as the arrangement of cache memories into multiple levels, are well known in the art.

Many modern CPU architectures, particularly those of the Harvard architecture class in which data and program memory are separate from one another, include separate cache memories for data and instructions. Indeed, the term Harvard architecture is now often used in connection with CPUs having a single main memory but having separate data and instruction caches. This separation of data and instruction caches takes advantage of the different data paths, and perhaps different points in the instruction pipeline, by way of which instructions and data operands are fetched, thus providing efficient cache usage, at least at a lower level (e.g., level 1 cache).

Even with the provision of a separate instruction cache, the determination of which instructions are to be stored in the instruction cache may vary, in efforts toward maximizing the cache "hit" rate (i.e., the percentage of fetches made from the cache). Of course, a high cache hit rate will improve the performance of the CPU and the power efficiency of the system. Other factors beside cache hit rate are important in this regard, however; for example, significant power dissipation may result from frequent reloading of the cache from memory.

By way of background, prior CPUs include a "repeat block" instruction in their instruction set, in response to which the CPU loads an instruction loop buffer with the indicated block. An example of such a prior CPU is the 320C54x family of digital signal processors available from Texas Instruments Incorporated.

Another conventional approach for utilizing an instruction cache is described in U.S. Pat. No. 5,579,493, in which the program being executed by the CPU includes a "repeat" instruction that identifies a module of the program that is to be repetitively executed. In this U.S. Pat. No. 5,579,493, the repeated block of instructions is stored in an instruction buffer, permitting fetches of the identified instructions from the instruction buffer rather than from memory, thus saving power. However, this approach also requires the use of a special instruction (the "repeat" instruction), which of course renders the use of the feature non-transparent to the programmer.

By way of further background, another conventional instruction cache approach is described in U.S. Pat. No. 4,626,988. This approach stores each fetched instruction in an instruction fetch look-aside buffer. Upon execution of a loop, the instruction fetch unit enters a loop mode, in which instructions are fetched from the buffer. However, each fetched instruction must be stored in the buffer, in preparation for possible loop mode entry.

BRIEF SUMMARY OF THE INVENTION

It is therefore an object of the present invention to provide an architecture for an instruction-programmable logic device, such as a microprocessor or digital signal processor, in which the number of accesses to instruction memory are mninimized.

It is a further object of the present invention to provide such a device in which an on-chip instruction buffer is efficiently used for the storage of instructions for small program loops.

It is a further object of the present invention to provide such a device in which such an instruction buffer is automatically utilized in a manner that is transparent to the programmer.

It is a further object of the present invention to provide such a device that is capable of utilizing the instruction buffer for nested program loops.

Other objects and advantages of the present invention will be apparent to those of ordinary skill in the art having reference to the following specification together with its drawings.

The present invention may be implemented by way of a loop cache, preferably implemented on-chip with the central processing unit (CPU) and in parallel with the lowest level instruction cache memory. In the loop cache, a base address register stores a base address of a sequence of fetch addresses for which instructions may be stored in entries of a branch cache register file. Valid bits are maintained for each entry of the branch cache register file, to indicate whether the corresponding register file entry contains a valid instruction. In carrying out the instruction fetch, a multiplexer selects either the output of the instruction cache memory or the output of the branch cache register file, depending upon whether the fetched instruction is validly present in the branch cache register file; control logic also disables reads from the instruction cache memory for its in the branch cache register file. According to one aspect of the invention, the branch cache register file is loaded in the event of a backward branch which misses the current contents of the instruction register file. According to another aspect of the invention, the branch cache register file is loaded for a loop beginning with a backward branch that has been taken twice in succession, with no intervening backward branch occurring.

DETAILED DESCRIPTION OF THE INVENTION

As will become apparent to those skilled in the art having reference to the following description, the present invention may be implemented in connection with a wide range of instruction-programmable logic devices, and systems including such logic devices. One example of such logic devices is a digital signal processor (DSP), in connection with which the preferred embodiments of the present invention will be described. However, it will be readily understood by those skilled in the art that the present invention may also be beneficially realized in a general purpose microprocessor, or in other application-specific processors such as graphics processors, instruction-programmable custom logic functions, and the like. It is of course contemplated that the present invention, as claimed hereinbelow, has a scope sufficient to include these and other alternative implementations.

Figure 1:
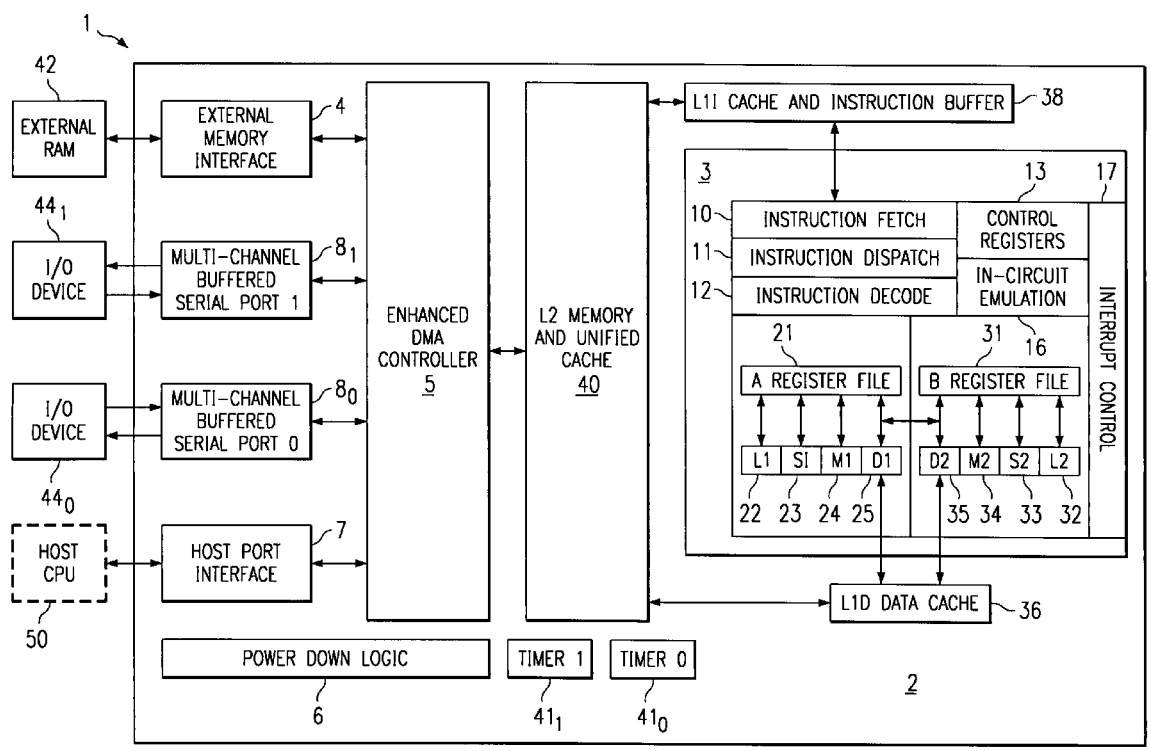
FIG. 1 is an electrical diagram, in block form, of a digital signal processor-based system constructed according to the preferred embodiments of the invention.

FIG. 1 is a block diagram illustrating the construction of electronic system 1, including digital signal processor (DSP) 2 constructed according to the preferred embodiments of the present invention. In this example, DSP 2 is realized as a 32-bit eight-way VLIW pipelined processor, including dual-data path central processing unit 3.

Central processing unit 3 includes instruction fetch unit 10, instruction dispatch unit 11, and instruction decode unit 12, for initiating and controlling simultaneous instruction execution in pipelined fashion, over the two data paths. Functionally, instruction fetch unit 10, instruction dispatch unit 11 and instruction decode unit 12 recall instructions from program memory (described in further detail hereinbelow), decode the instructions, and deliver control signals to the functional units in the data paths to effect execution of the instructions. As many as eight 32-bit instructions may be executed in each instruction cycle, with processing occurring simultaneously in each of the two data paths of central processing unit 3.

A first data path of central processing unit 3 includes four functional execution units, designated in this example as L1 unit 22, S1 unit 23, M1 unit 24 and D1 unit 25. These execution units 22, 23, 24, 25 are each operable in connection with register file 21. The second data path is similarly constructed, and includes four functional execution units designated L2 unit 32, S2 unit 33, M2 unit 34 and D2 unit 35, each coupled to register file 31. Each of register files 21, 31 in this example include sixteen 32-bit general purpose registers, which can be used for data, as data address pointers, or as condition registers, depending upon the instruction.

In this exemplary implementation of the present invention, L functional units 22, 32 are arithmetic and logical units for performing operations such as 32- and 40-bit arithmetic and compare operations, bit and normalization counts, and 32 bit logical operations. S functional units 23, 33 are arithmetic and logical units for performing 32-bit arithmetic and logical operations, shifts and bit-field operations, constant generation, branching, and register transfers to and from control registers 13. M functional units 24, 34 are 16×16 bit multipliers, which are particularly useful in digital signal processing operations involving multiply-and-accumulates. D functional units 25, 35, are arithmetic units for performing 32-bit adds and subtracts, and 32-bit linear and circular address calculation. Additionally, as suggested by FIG. 1, central processing unit includes cross register paths that permit L1 unit 22, S1 unit 23 and M1 unit 24 to receive operands from register file 31, and permit L2 unit 32, S2 unit 33 and M2 unit 34 to receive operands from register file 21.

Central processing unit 3 further includes control registers 13 and control logic 14 which control its configuration and operation. Central processing unit 3 also includes special functions such as test logic 15, emulation logic 16 and interrupt logic 17, for controlling those conventional functions.

Central processing unit 3 is coupled to program memory (also referred to as instruction memory), by way of L1I cache and instruction buffer system 38 constructed according to the preferred embodiments of the invention. Specifically, in this example, instruction fetch unit 10 applies one or more thirty-two bit addresses to L1I cache and instruction buffer system 38, and receives corresponding instruction codes therefrom (e.g., over a 256-bit instruction bus) to complete the instruction fetch operation. The particular construction of L1I cache and instruction buffer system 38 according to the preferred embodiments of the invention will be described in further detail hereinbelow. In DSP 2 of FIG. 1, L1I cache and instruction buffer system 38 is bidirectionally coupled to L2 memory and unified cache 40, from (or through) which instruction codes may be fetched when not present in L1I cache and instruction buffer system 38.

On the data side, each of the two data paths of central processing unit 3 are bidirectionally coupled to L1D data cache 36, which operates as a first level cache for data. According to the preferred embodiments of the invention L1D data cache 36 is organized as a two-way set associative cache, for example having a 32-byte line size. L1D data cache 36 is in turn bidirectionally coupled to L2 memory and unified cache 40; in the event of a miss in L1D data cache 36, L1D data cache 36 requests a cache line of data from L2 memory and unified cache 40.

L2 memory and unified cache 40 in DSP 2 according to the preferred embodiments of the invention is implemented on-chip with central processing unit 3, and in this example is a unified memory that may be software-configured. The selectable configuration defines the size of level two unified (i.e. both program and data) cache versus the size of memory mapped random access memory (RAM) sectors within L2 memory and unified cache 40. The configuration of L2 memory and unified cache 40 may be defined, for example, by setting control bits in control registers 13. To the extent configured as cache, L2 memory and unified cache 40 simultaneously stores the same memory locations as are stored in L1I cache and instruction buffer 38 and L1D data cache 36, as well as additional memory location contents; in this example, L2 memory and unified cache 40 "snoops" L1D data cache 36 to determine whether it contains modified versions of the contents of its own memory locations, to ensure cache coherency.

In that a cache or RAM access by central processing unit 3 is a miss relative to L2 memory and unified cache 40, L2 memory and unified cache 40 forwards the requested memory address to enhanced DMA controller 5 which, via external memory interface 4 of DSP 2, effects the necessary read or write access of external random access memory (RAM) 42, which may be in the form of synchronous SRAM, asynchronous SRAM, or synchronous DRAM; the accessed memory location is then written into L2 memory and unified cache 40, and into lower level caches as appropriate. Via multi-channeled buffered serial ports $8_0$, $8_1$, enhanced DMA controller 5 also controls the communication of data to and from L2 memory and unified cache 40, and thus to and from central processing unit 3, relative to input/output devices $44_0$, $44_1$, respectively. Host port interface 7 is also coupled to enhanced DMA controller 5, by way of which a host central processing unit 50 may communicate with DSP 2.

Other functions are also present within DSP 2 as desired. In this example, power-down logic 6 is provided, for halting central processing unit activity, peripheral activity, and phase lock loop (PLL) clock synchronization activity to reduce power consumption. Programmable timers $41_0$, $41_1$ are also provided in this example, to permit DSP 2 to effect controller-like functions.

Figure 2:
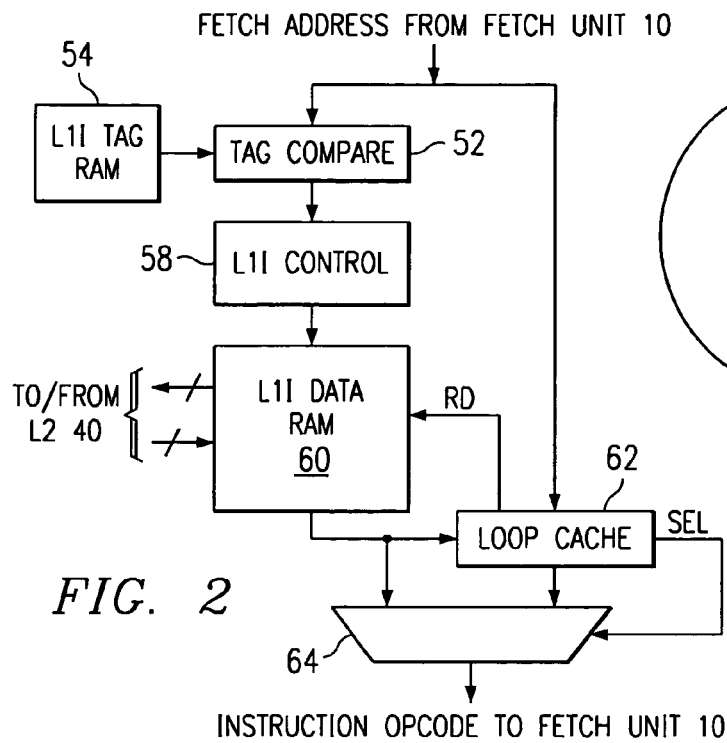
FIG. 2 is an electrical diagram, in block form, of a first level instruction cache and instruction buffer function in the digital signal processor of FIG. 1 according to the preferred embodiments of the invention.

Referring now to FIG. 2, the construction of L1I cache and instruction buffer 38 according to the preferred embodiments of the present invention will now be described in detail. Of course, it is contemplated that alternative realizations of the construction of L1I cache and instruction buffer 38 will become apparent to those skilled in the art having reference to this specification, and it is therefore understood that these and other such realizations will be within the scope of the present invention.

In the example of FIG. 2 according to the preferred embodiments of the present invention, L1I cache and instruction buffer 38 is arranged as a conventional level 1 program cache in parallel with loop cache 62. On the level 1 program cache side, L1I tag RAM 54 is a cache tag memory for storing portions of the memory addresses for which the contents are retained in L1I data RAM 60 in L1I cache and instruction buffer 38. L1I tag RAM 54 is coupled to tag comparator 52, which receives a fetch address from instruction fetch unit 10 in central processing unit 3 at another input. Tag comparator 52 is operable to compare the fetch address received from instruction fetch unit 10 against the current contents of L1I tag RAM 54, to determine whether the fetch address matches one of the tags stored in L1I tag RAM 54 (i.e., corresponds to a cache "hit" in L1I data RAM 60). Tag comparator 52 presents the results of this comparison to L1I control logic in L1I cache and instruction buffer 38, which controls the operation of L1I data RAM 60 accordingly.

L1I data RAM 60 is a dedicated program cache memory, containing in this example the contents of memory locations corresponding to the tag addresses stored in L1I tag RAM 54. The particular construction and arrangement of L1I data RAM 60 may correspond to any conventional cache memory architecture, including multiple-way set associative cache arrangements. According to the preferred embodiments of the invention, however, and primarily because of its use as an instruction cache in a digital signal processor, L1I data RAM 60 is a direct-mapped cache. The direct-mapped arrangement is particularly useful in DSP architectures, because of the tendency of DSP code to consist of small and tight program loops that rarely "thrash". By way of example, L1I data RAM 60 may be of a 4k-byte capacity, arranged as sixty-four cache lines of sixty-four bytes each. In this case, L1I tag RAM 54 will include sixty-four tag entries, one for each cache line in L1I data RAM 60; preferably, L1I tag RAM 54 also includes a valid bit for each of the cache entries, although the valid bit may alternatively be located elsewhere (such as in L1I data RAM 60 or even in L1I control logic 58), if so desired.

L1I data RAM 60 also includes a port coupled to L2 memory and unified cache 40. This connection permits the reloading of L1I data RAM 60 from L2 memory and unified cache 40 with cache lines corresponding to instruction fetch addresses that "miss" the tags in L1I tag RAM 54. This loading is carried out under the control of L1I control logic 58, by the issuing of a memory address to L2 memory and unified cache 40 (and, if a "miss" occurs at that level, to external RAM 42 via external memory interface 4), in response to which the memory location contents are written into L1I data RAM 60.

According to the preferred embodiments of the invention, the output of L1I data RAM 60, which presents an instruction opcode in response to the fetch address from fetch unit 10 in both the cache miss and cache hit cases, is applied to one input of multiplexer 64.

As noted above, loop cache 62 is provided in L1I cache and instruction buffer 38 in parallel with L1I data RAM 60. According to this preferred embodiments of the invention, loop cache 62 is an instruction buffer subsystem for storing the contents of memory locations corresponding to instruction fetch addresses that are being repetitively accessed, such as in a small program loop. In order to provide significant benefit, loop cache 62 is constructed so that accesses thereto consume significantly less power than accesses to other program memory, including accesses to L1I data ram 60 (and, of course, accesses to L2 memory and unified cache 40, and of course external memory 42). In this regard, the capacity of loop cache 62 is preferably relatively small, and its storage arrangement preferably in the form of a register file to which indexed accesses are made. The detailed construction of loop cache 62 according to preferred embodiments of the invention will be described in further detail hereinbelow.

In its general construction, loop cache 62 has an input connected to receive the fetch address and corresponding control signals from instruction fetch unit 10 of central processing unit 3; such control signals may include, for example, a signal indicating that the fetch address is valid. Loop cache 62 provides a read control signal on line RD to L1I data RAM 60. Loop cache 62 also has an output for presenting, to one input of multiplexer 64, an instruction opcode corresponding to the fetch address in the event of a "hit" thereto. Loop cache 62 also has a control signal output that drives line SEL, and thus select control input of multiplexer 64, to control the selection of either the output of L1I data RAM 60 or of loop cache 62 itself for application to fetch unit 10, responsive to the comparison of the fetch address to the addresses stored in loop cache 62. Additionally, loop cache 62 has a data input coupled to the output of L1I data RAM 60, by way of which loop cache 62 may be loaded with the contents of memory locations.

In its general operation, according to the preferred embodiments of the present invention, loop cache 62 receives the fetch address from fetch unit 10, and effectively compares this fetch address with a range of addresses for which loop cache 62 currently contains the corresponding contents. If the fetch address matches, loop cache 62 presents a read disable signal on line RD to L1I data RAM 60 to preclude its operation (and thus saving power) in favor of loop cache 62 itself presenting the fetched instruction opcode to multiplexer 64, and controlling multiplexer 64 to select this output for application to fetch unit 10. In addition, loop cache 62 may also provide a control signal to L1I tag RAM 54 to disable tag reads upon a hit of loop cache 62 by the fetch address. On the other hand, if the fetch address is not within the range of addresses stored within loop cache 62, loop cache 62 asserts a read enable signal on line RD to L1I data RAM 60 (whether the contents are currently stored in L1I data RAM 60, in L2 memory and unified cache 40, or in external RAM 42), and controls multiplexer 64 to select the output of L1I data RAM 60 for application to fetch unit 10.

As noted above, the data output of L1I data RAM 60 is also applied to an input of loop cache 62, so that storage locations in loop cache 62 may be loaded with the contents of memory locations. The determination of when to load loop cache 62, and from which memory locations, will now be described in connection with the preferred embodiments of the invention.

According to a first preferred embodiment of the present invention, loop cache 62 operates according to an approach, referred to herein as "loop front cache", in which a register file in loop cache 62 is loaded in the event of any backward branch that is a miss relative to loop cache 62, following which fetches to those access loop cache 62 rather than L1I data RAM 60. In this first preferred embodiment of the invention, the loop front cache technique will provide significant power savings, including in program sequences involving nested loops.

Figure 3:
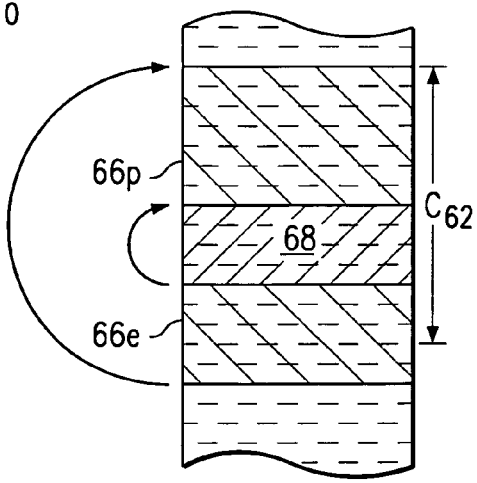
FIG. 3 is a memory map of a sequence of instructions, illustrating portions of program memory retained within a branch cache register file in the first level instruction cache and instruction buffer function of FIG. 2 according to a first preferred embodiment of the invention.

Attention is directed to FIG. 3, by way of which the operation of the loop front cache according to this first preferred embodiment of the invention will be described relative to a memory map representation of an example of a sequence of instructions, arranged as a sequence of cache lines (it being understood that each cache line will likely contain multiple instructions). In the example of FIG. 3, outer loop 66 surrounds inner loop 68, with the portion of outer loop code preceding inner loop 68 represented by prologue 66p and the portion of outer loop code subsequent to inner loop 68 represented by epilogue 66e. The capacity $C_{62}$ of loop cache 62 is represented in FIG. 3, covering the number of contiguous cache lines including prologue 66p, inner loop 68, and a portion of epilogue 66e.

According to this first embodiment of the invention, as noted above, loop cache 62 is loaded upon each backward branch that is a miss. In the example of FIG. 3, loop cache is originally loaded with the contents indicated by capacity $C_{62}$ upon the first occurrence of the backward branch from the end of epilogue 66e; this includes the entirety of inner loop 68. As a result, referring also to FIG. 2, the fetch of each instruction within prologue 66p and within inner loop 68 (as well as within the upper portion of epilogue 66e) is made from loop cache 62 rather than from L1I data RAM 60, saving significant power for each access, especially if the loop counts for loops 66, 68 are large.

Figure 4:
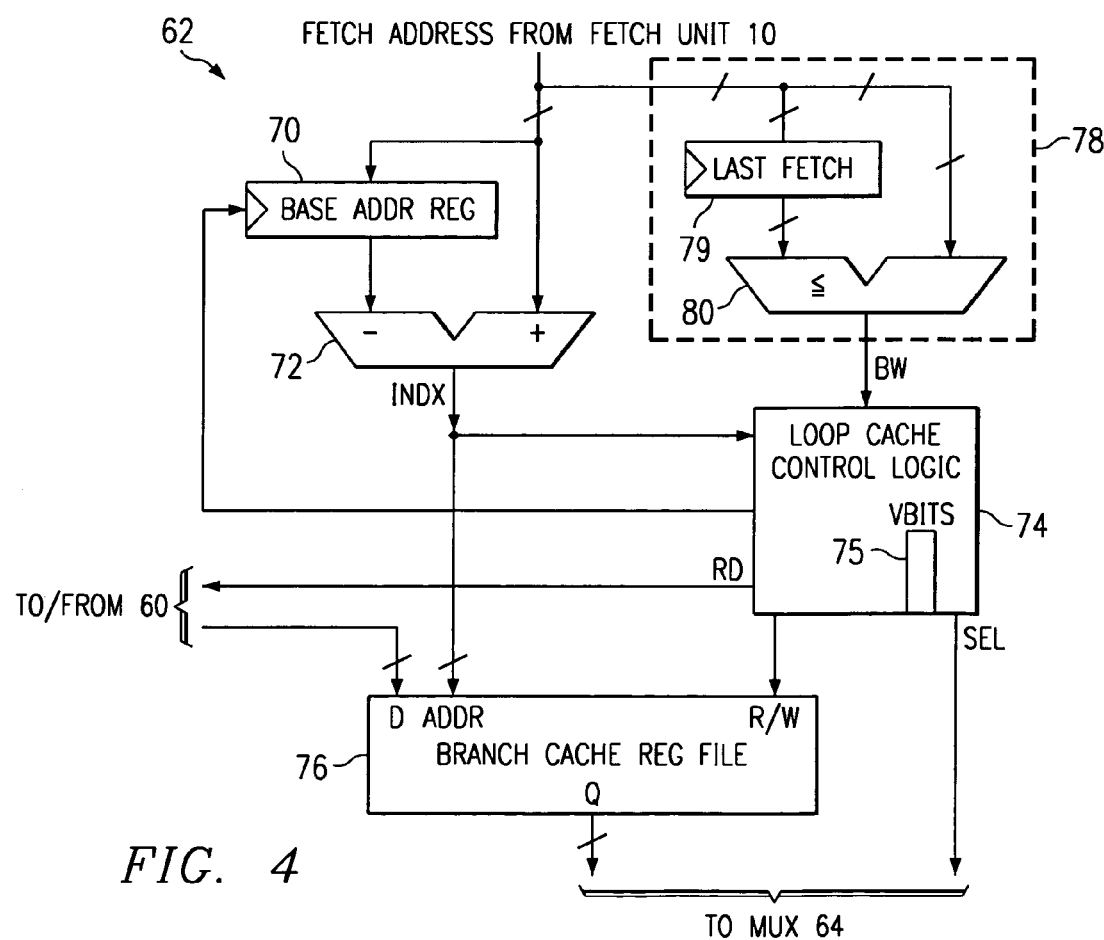
FIG. 4 is an electrical diagram, in block form, illustrating the construction of a loop cache according to the first preferred embodiment of the invention.

Referring now to FIG. 4, the construction of loop cache 62 according to this first preferred embodiment of the present invention, which implements the loop front cache, will now be described in detail. Loop cache 62 includes base address register 70, which has a data input receiving the fetch address from fetch unit 10, and a control input driven by loop cache control logic 74; base address register 70 effectively operates as a single entry cache tag memory, as will be described hereinbelow relative to the operation of loop cache 62. A data output of base address register 70 and the fetch address from fetch unit 10 are applied to complementary inputs of adder 72, which generates a digital output on lines INDX corresponding to the difference between the current fetch address and the current contents of base address register 70, and divided by the number of bytes per cache line. This division may be carried out by simply selecting the most significant bits of the output of the subtraction by adder 72, in the preferred case where the number of bytes per cache line is a power of two (e.g., 32). Lines INDX, carrying this index value, are applied to loop cache control logic 74 and also as an address input to branch cache register file 76.

Branch cache register file 76 in loop cache 62 according to this first preferred embodiment of the invention is arranged as an indexed set of N registers, each for storing a cache line of instruction opcodes, where the value N refers to the depth of the loop front cache. The optimal depth N of loop cache 62 according to the present invention will depend upon the specifics of the cache architecture, as well as upon the nature of the code to be executed thereby. For purposes of power efficiency, it is desirable that N be maintained relatively small (e.g., thirty-two or less), as significant benefit may be obtained with as few as four entries; in any event, the value of N need not correspond to a power of two. The address input of branch cache register file 76 receives the index value from adder 72, responsive to which one of the registers of branch cache register file 76 is selected for read or write access, depending upon the state of control signals generated by loop cache control logic 74 and applied to control inputs R/W of branch cache register file 76. Data input D receives data from L1I data RAM 60, for storing in the selected register during write accesses, and data output Q is applied to multiplexer 64 to present the contents of the selected register during read 1 accesses.

Loop cache control logic 74 controls the operation of loop cache 62 in response to the index value presented by adder 72 on lines INDX, and in response to a control signal presented on line BW that indicates whether the current fetch address is a backward branch. The operation of loop cache control logic 74 also depends upon the state of valid bits corresponding to the entries in branch cache register file 76, such valid bits stored in register 75 within loop cache control logic 74 itself.

According to the example of this first preferred embodiment of the invention illustrated in FIG. 4, the control signal on line BW is produced by backward branch detection logic 78 within loop cache 62 itself. In this example, backward branch detection logic 78 includes last fetch register 79, which stores the previous fetch address; in operation, last fetch register 79 stores the current fetch address from fetch unit 10 while presenting its current contents, corresponding to the previous fetch address, to one input of comparator 80. The other input of comparator 80 receives the current fetch address from fetch unit 10 as shown in FIG. 4, and asserts a signal on line BW responsive to the current fetch address being less than or equal to the previous fetch address stored in last fetch register 79.

Alternatively, line BW may carry a control signal generated by instruction fetch unit 10 itself in central processing unit 3, indicating that the current fetch address corresponds to a backward branch. In this case, of course, backward branch detection logic 78 will not be present within loop cache 62 but will instead be provided within central processing unit 3.

Loop cache control logic 74, as noted above, controls the operation of loop cache 62 in response to the control signal on line BW, in response to the value presented by adder 72 on lines INDX, and in response to the status of valid bits in register 75. This control is effected by way of control signals applied to control inputs R/W of branch cache register file 76, and the control signal on line SEL applied to the select input of multiplexer 64 (FIG. 2). Additionally, loop cache control logic 74 enables and disables reads from L1I data RAM 60, by way of a control signal on line RD. It is contemplated that loop cache control logic 74 may be readily realized, by those skilled in the art having reference to this specification, for example by way of combinational or sequential logic suitable for carrying out the operation of loop cache 62 described below.

Figure 5:
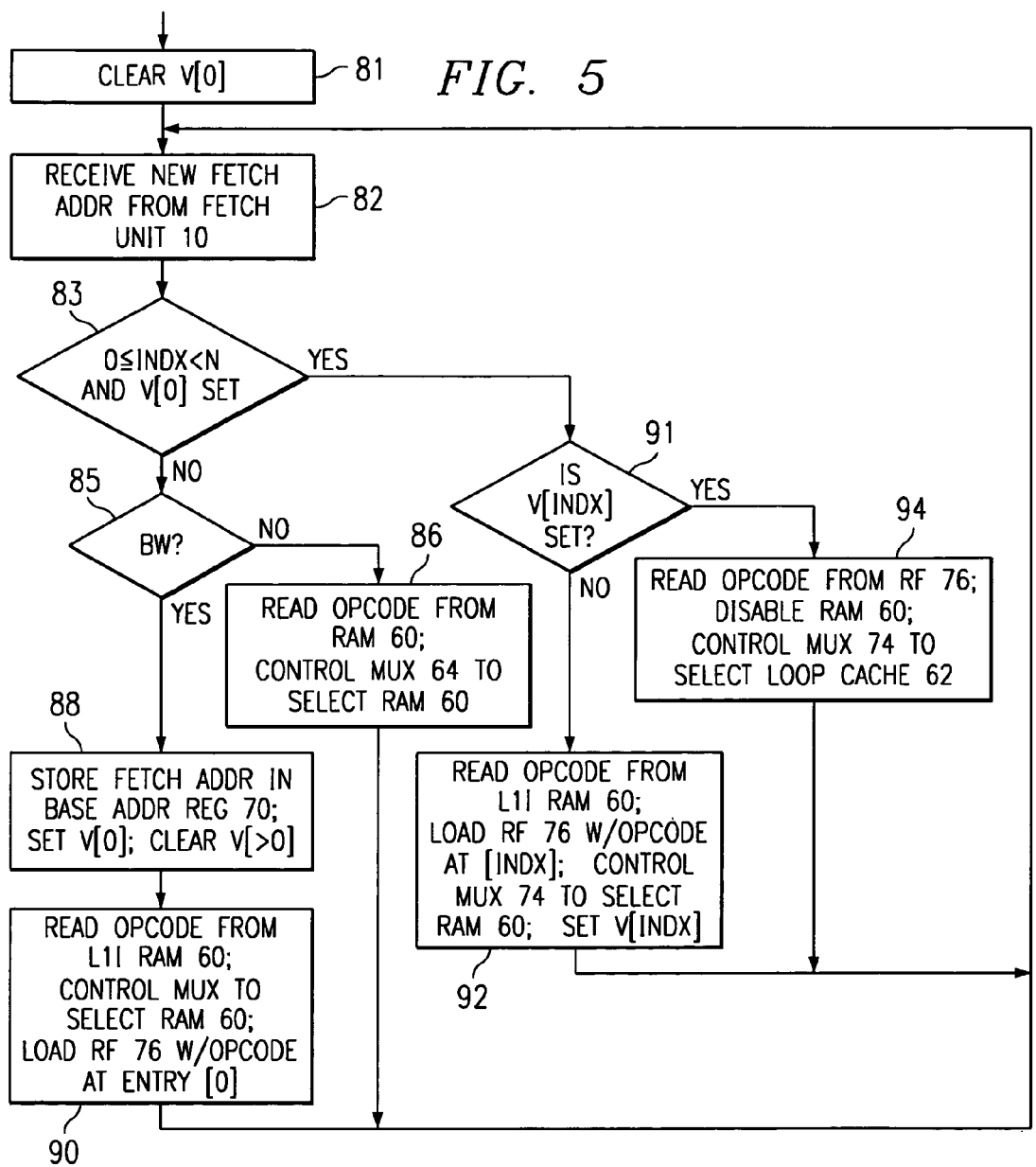
FIG. 5 is a flow diagram illustrating the operation of the loop cache of FIG. 4, according to the first preferred embodiment of the invention.

Referring now to FIG. 5, the operation of loop cache 62, under the control of loop cache control logic 74, according to this first preferred embodiment of the invention will now be described in detail. As shown in FIG. 5, the operation of loop cache 62 is initialized in process 81 by the clearing of the valid bit in register 75 for index value 0 (which corresponds to the base address). In process 82, loop cache 62 receives a new fetch address from instruction fetch unit 10 of central processing unit 3.

Upon receipt of the new fetch address in process 82, loop cache control logic 74 first performs decision 83, to effectively determine whether the fetch address is a "hit" relative to loop cache 62. Decision 83 is performed by adder 72 generating a digital value on lines INDX corresponding to the difference between the current contents of base address register 70 (which corresponds to the lowest memory address currently stored in branch cache register file 76) and the fetch address received in process 82, divided by the number of bytes per cache line. Loop cache control logic 74 compares this value on lines INDX with zero and with depth N of loop cache 62, to determine whether the fetch address is within the range of addresses that are stored in loop cache 62. Additionally, loop cache control logic 74 tests the valid bit for index value 0, in register 75, to determine whether branch cache register file 76 has a valid instruction code stored in its initial entry corresponding to the contents of base address register 70; if not, branch cache register file 76 does not contain any valid instruction opcodes and the fetch address therefore cannot correspond to a hit of loop cache 62. As evident from the foregoing, loop cache 62 stores a sequential set of cache lines, rather than cache lines having non-sequential tag addresses.

In the event that the fetch address misses loop cache 62 (i.e., decision 83 is NO), loop cache control logic 74 next executes decision 85 to determine whether the current fetch address is indicative of a backward branch. Decision 85 may be performed by the operation of backward branch detection logic 78, which compares the current fetch address to the contents of last fetch register 79 and generates a signal on line BW accordingly; alternatively, decision 85 may be performed by central processing unit 3 itself, with the result communicated to loop cache control logic 74 on line BW. In the event that the current fetch address is both a "miss" and is not a backward branch (decision 85 is NO), loop cache control logic 74 enables the reading of the desired instruction opcode from L1I data RAM 60 by asserting a signal on line RD, and also controls multiplexer 64 to select the output of L1I data RAM 60 by way of the appropriate signal on line SEL; these operations are shown in FIG. 5 by way of process 86. Control then passes back to process 82, to await the receipt of the next fetch address from instruction fetch unit 10.

On the other hand, as discussed above, loop cache 62 is operable to begin loading branch cache register file 82 in the event of a fetch that is a cache miss but which corresponds to a backward branch. Referring back to FIG. 5, upon the current fetch address missing loop cache 62 (i.e., decision 83 is NO) but corresponding to a backward branch (decision 85 is YES), loop cache control logic 74 executes process 88 to initiate loading of branch cache register file 76. In process 88, loop cache control logic 74 issues a control signal to base address register 70 to cause the storing of the current fetch address therein, as the base address. In addition, loop cache control logic 74 sets the valid bit for index value 0, and clears all other valid bits in register 75. Loop cache control logic 74 then performs process 90 by asserting a signal on line RD to enable the reading of the desired instruction opcode from L1I data RAM 60, and by controlling multiplexer 64 to select the output of L1I data RAM 60. In addition, loop cache control logic 74 issues a write control signal to control input R/W of branch cache register file 76, so that the opcode presented at the output of L1I data RAM 60 and thus at the D input of branch cache register file 76 is loaded into its entry[0] (i.e., corresponding to the base address, which has an index value of 0). Control then passes back to process 82 to await the next fetch address.

Referring back to decision 83, upon the receipt of a fetch address that is within the range N of the base address stored in base address register 70 (i.e., decision 83 is YES), loop cache control logic 74 next performs decision 91 to determine if the valid bit corresponding to the digital value on lines INDX (i.e., the difference between the fetch address and the base address) is set. If not (decision 91 is NO), the entry corresponding to the current index value on lines INDX is not the correct opcode. Process 92 is then performed by loop cache 62 under the control of loop cache control logic 74, by enabling the reading of the desired instruction opcode from L1I data RAM 60 (via line RD) and by loading the output of L1I data RAM 60 into branch cache register file 76 at its entry corresponding to the current index value on lines INDX; loop cache control logic 74 then also sets the valid bit in register 75 corresponding to the current index value. Additionally, loop cache control logic 74 controls multiplexer 64 to select the output of L1I data RAM 60 by way of the appropriate signal on line SEL, thus forwarding the desired instruction opcode to central processing unit 3.

On the other hand, if the valid bit in register 75 is set for the current index value on lines INDX (decision 91 is YES), loop cache 62 indeed is storing the currently valid opcode for the instruction addressed by the fetch address received in process 82. Loop cache control logic 74 then performs process 94 to fetch the opcode from the entry of branch cache register file 76 indicated by the index value on lines INDX, by applying a read control signal to control input R/W of branch cache register file 76. This read of branch cache register file 76 is performed to the exclusion of L1I data RAM 60, by loop cache control logic 74 applying a disable signal on line RD; this disabling of a read access of L1I data RAM 60 saves significant power, providing one of the important benefits of the present invention. As noted above, L1I tag RAM 54 may also be disabled by loop cache control logic 74 upon a YES result of decision 91, to save additional power by preventing tag address reads for loop cache 62 hits. In process 94, loop cache control logic 74 also controls multiplexer 64, by way of a signal on line SEL, to select loop cache 62 for application at its output, so that the opcode stored in branch cache register file 76 is presented to instruction fetch unit 10.

According to the method of operation of loop cache 62 as shown in FIG. 5, loop cache 62 is loaded with instruction opcodes in response to a backward branch that is a miss relative to loop cache 62. This loading occurs by decisions 83, 85 first detecting a miss by a backward branch (decisions 83, 85 are NO and YES, respectively). The first entry of branch cache register file 76 is then loaded with the opcode of the base address, in process 90, with base address register 70 storing the base address, and with all valid bits in register 75 except for the first entry being cleared in process 88. The next successive sequential instruction fetches will load branch cache register file 76 with opcodes through the operation of decision 83 (being YES), decision 91 (NO), and process 92, until the end of branch cache register file 76 is reached. At any subsequent time in which a "hit" of loop cache 62 occurs (decision 83 is YES), because the valid bits in register 75 have all been set in the iterations of process 92, the instruction opcodes will be read (in process 94) from branch cache register file 76 rather than from L1I data RAM 60, thus saving power that otherwise would result from such accesses. This operation continues even in the case of nested loops, such as shown in FIG. 3, considering that each of the fetch addresses of prologue 66p and inner loop 68 correspond to "hits" in loop cache 62 (decisions 83 and 91 are both YES); the backward branch instruction at the end of inner loop 68 does not cause reloading of branch cache register file 76, as this backward branch instruction is also a hit.

This state of operation, and the contents of branch cache register file 76, remain intact until the fetch of the next backward branch instruction that has a destination not corresponding to one of the memory locations in branch cache register file 76; in other words, until decision 83 is NO and decision 85 is YES for a given fetch instruction. In the example of FIG. 3, those instruction fetches near the end of epilogue 66e of the outer loop that are not stored in branch cache register file 76 (i.e., for which decision 83 is NO) do not cause reloading of branch cache register file 76, as these instructions are not backward branches (i.e., decision 85 is NO in each case). The opcodes for this terminal portion of epilogue 66e are simply read from L1I data RAM 60, in process 86. The fetch of the backward branch following the last instruction of epilogue 66e is indeed a backward branch, but because this fetch is a "hit" of loop cache 62, decision 83 is YES and fetching from branch cache register field 76 via process 94 continues.

This first preferred embodiment of the invention thus provides the important benefit of reduced power dissipation, by eliminating the necessity of accessing level one program cache memory for instructions that are within a small tight program loop. In applications such as DSP routines, in which such loops are prevalent, the overall power savings can be significant. Additionally, the operation of this preferred embodiment of the invention does not require special instructions or alteration of the program, nor are all instruction opcodes automatically fetched and loaded.

While this loop front cache approach according to this first preferred embodiment of the invention provides this benefit of reduced power consumption, and in a manner in which the instruction opcodes of the loop are loaded into loop cache 62 during the first return pass through the loop, the loop front cache approach presents certain limitations. For the example of nested loops, with reference to FIG. 3, if the sum of the cache lines required for prologue 66p and inner loop 68 exceeds loop cache capacity $C_{62}$, instructions in inner loop 68 will not be present in loop cache 62, reducing the overall benefit for a significant portion of the nested loop cycles (i.e., prologue 66p instructions are in loop cache 62, despite being accessed only 1/m as often as inner loop 68 instructions, m being the loop count of inner loop 68). Furthermore, if prologue 66p itself exceeds loop cache capacity $C_{62}$, loop cache 62 will "thrash" between the top of inner loop 68 and the top of outer loop 66. Still further, many fetch packets will be stored in loop cache 62 that are only executed once, which may degrade power savings in some circumstances.

A second preferred embodiment of the present invention, referred to herein as a "loop tail cache", addresses these limitations, at a cost of requiring each loop to execute twice from the level one program cache memory before being loaded into the loop cache. In general, the loop tail cache approach loads the loop cache for backward branches that miss the loop cache (as in the loop front cache), but only in the case where the backward branch miss has occurred twice in a row. The term "twice in a row" refers to the fetching of the same backward branch twice, with no other backward branch fetch occurring therebetween.

Figure 6:
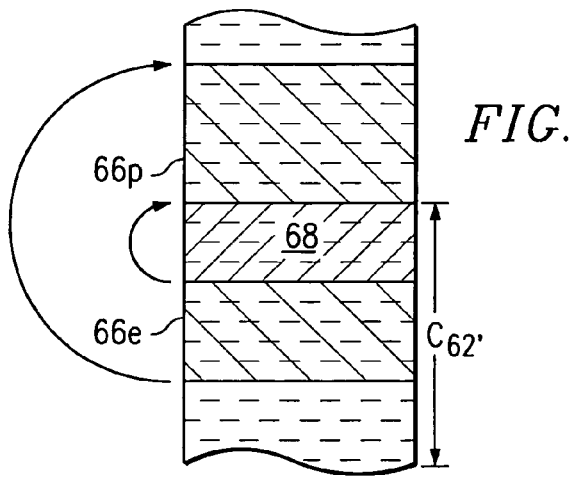
FIG. 6 is a memory map of a sequence of instructions, illustrating portions of program memory retained within a branch cache register file in the first level instruction cache and instruction buffer function of FIG. 2 according to a second preferred embodiment of the invention.

Referring now to FIG. 6, the sequence of instructions previously discussed hereinabove relative to FIG. 3 is again illustrated, with outer loop 66 having prologue 66p leading inner loop 68, and epilogue 66e trailing inner loop 68. According to the loop tail cache of this second preferred embodiment of the invention, the top of the loop cache corresponds to the top of inner loop 68, rather than to the top of outer loop 66. This results from the backward branch to the top of inner loop 68 occurring twice in a row, while the backward branch to the top of outer loop 66 will not occur twice in a row (as one or more instances of the backward branch of inner loop 68 will necessarily occur between successive backward branches of outer loop 66). The contents of loop cache 62' according to this second embodiment of the invention, occupying capacity $C_{62}'$ of FIG. 7, will therefore always begin with and include inner loop 68, and may also include part or all of epilogue 66e (and may even include instructions beyond outer loop 66).

Figure 7:
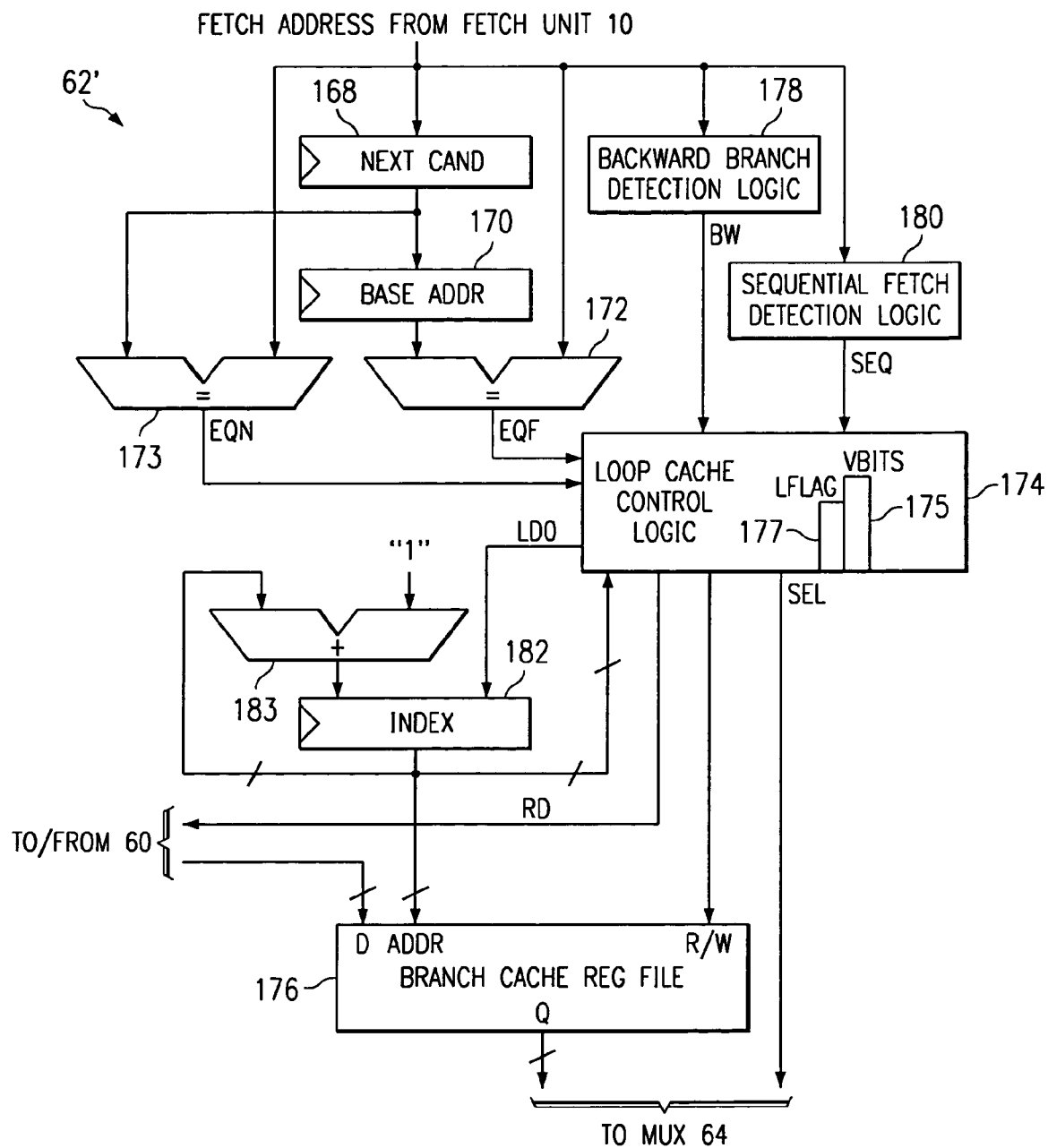
FIG. 7 is an electrical diagram, in block form, illustrating the construction of a loop cache according to the second preferred embodiment of the invention.

Referring now to FIG. 7, the construction of loop cache 62' according to this second preferred embodiment of the present invention will now be described. As will be apparent from the following description, loop cache 62' includes several similar elements as included within loop cache 62 described hereinabove.

Loop cache 62' operates to access (read or write) entries in branch cache register file 176, depending upon a current fetch address received from instruction fetch unit 10 in central processing unit 3. As in the previously-described embodiment of the present invention, branch cache register file 176 in this example is an indexed set of N registers, each register location, or entry, storing a full cache line of instruction opcodes. The value N refers to the depth of the loop tail cache implemented by loop cache 62'. According to this second preferred embodiment of the invention, branch cache register file 176 has an address input coupled to receive an index value from index register 182, responsive to which an entry of branch cache register file 176 will be selected for read or write access, under the control of signals applied by loop cache control logic 174 to its control input R/W. Data input D of branch cache register file 176, as before, receives opcode data from L1I data RAM 60, and data output Q of branch cache register file 176 is applied to an input of multiplexer 64, by way of which the contents of the selected entry may be presented to central processing unit 3.

Next candidate address register 168 in loop cache 62' has a data input receiving the fetch address from fetch unit 10, and has an output coupled to one input of comparator 173 and to a data input of base address register 170. Base address register 170 has an output connected to an input of comparator 172. Each of next candidate address register 168 and base address register 170 have a control input that is driven by loop cache control logic 174 (such connection not shown in FIG. 7). Comparators 172, 173 each have a second input that directly receives the fetch address from fetch unit 10. As such, comparator 172 compares the current fetch address with the current contents of base address register 170, while comparator 173 compares the current fetch address with the current contents of next candidate address register 168. Outputs of comparators 172, 173 are forwarded to loop cache control logic 174 on lines EQF, EQN, respectively.

The current fetch address from fetch unit 10 is also received by backward branch detection logic 178 which determines whether the current fetch address is a backward branch; the result of this determination is forwarded to loop cache control logic 174 over line BW. Backward branch detection logic 178 is constructed similarly as backward branch detection logic 78 in loop cache 62 of FIG. 4, described hereinabove. Alternatively, a signal on line BW may be generated by fetch unit 10 in central processing unit 3 itself, which would eliminate the need for backward branch detection logic 178 in loop cache 62'.

As will be described hereinbelow, loop cache 62' also operates in response to whether the current fetch address from fetch unit 10 is in sequence relative to the previous fetch address. According to this preferred embodiment of the invention, therefore, loop cache 62' includes sequential fetch detection logic 180 for making this determination and, in the event the current fetch address is the next in sequence from the previous fetch address, asserts a signal on line SEQ that is applied to loop cache control logic 174. Sequential fetch detection logic 180 may be constructed to include a register for storing the previous fetch address, and combinational logic that generates the signal on line SEQ responsive to the difference between the contents of that register and the current fetch address differing by one (i.e., are in sequence). Effectively, sequential fetch detection logic 180 asserts a signal in response to the truth of the relationship:

$$A-B=1$$

where A refers to the current fetch address, and B refers to the previous fetch address. This equation may be reduced, for purposes of facilitating this comparison, by:

$$A+(-B)=1$$

where −B is the two's complement, or arithmetic complement of the previous fetch address in a representation including a sign bit. It is known, of course, that a negatively-signed two's complement representation of a digital value differs from a bit-wise complement of that value by one; in other words, one may express this relationship as:

$$A+(\sim B+1)=1$$

where ~B is the one's complement, or bitwise complement, of the previous fetch address. This relationship is, of course, reducible to:

$$A+\sim B=0$$

In other words, if the current fetch address plus the bitwise complement of the previous fetch address equals zero (i.e., the two's complement of negative zero, which is represented by all 1's), the current fetch address is the next sequential address of the previous fetch address. U.S. Pat. No. 5,600,583, issued Feb. 4, 1997, commonly assigned herewith, and incorporated herein by this reference, describes logic circuitry for efficiently determining whether the sum of two digital values equals zero; sequential fetch detection logic 180 according to this preferred embodiment of the invention may be constructed in the manner described in said U.S. Pat. No. 5,600,583, to perform this comparison.

Alternatively, central processing unit 3 may itself generate a signal on line SEQ, forwarded to loop cache control logic 174, to indicate that the current fetch address is the next in sequence from the previous fetch address.

Loop cache 62' according to this embodiment of the invention further includes index register 182, which receives a reset input from loop cache control logic 174 on line LD0. Index register 182 has an output that is applied to the address input of branch cache register file 176, and also to loop cache control logic 174 for interrogation of its contents. This output of index register 182 is also presented to one input of adder 183, which has a hardwired "1" applied to its other input, and which has its output coupled to the input of index register 182, so that each operation of adder 183 increments the contents of index register 182 to update its contents for the next fetch address operation. A control signal (not shown) from loop cache control logic 174 controls the storing of values in index register 182.

Loop cache control logic 174, according to this preferred embodiment of the invention, includes valid bit register 175 for storing a valid bit associated with each entry of branch cache register file 176. Each valid bit indicates, when set, that the contents of the associated entry of branch cache register file 176 contains a valid opcode for the associated fetch address. Loop cache control logic 174 also includes flag LFLAG which, when set, indicates that the most recent fetch of the address currently stored in base address register 170 was a "hit" relative to loop cache 62'.

As before, loop cache control logic 174 controls the operation of loop cache 62' by control signals applied to control inputs R/W of branch cache register file 176, by the control signal on line SEL applied to the select input of multiplexer 64 (FIG. 2), and by controlling the storing of values into next candidate address register 168, base address register 170, and index register 182. As in the case of loop cache 62 described above, loop cache control logic 174 also enables and disables reads of L1I data RAM 60 by issuing control signals on line RD. It is contemplated that loop cache control logic 174 may be readily realized, by those skilled in the art having reference to this specification, for example by way of combinational or sequential logic suitable for carrying out the operation of loop cache 62' as will now be described relative to FIG. 8.

For purposes of this description, the operation of loop cache 62' will be described from an initial state in which all of the valid bits in register 175 are clear, and in which flag LFLAG is also clear. This state corresponds to the condition in which no valid opcodes are stored in branch cache register file 176, and in which no backward branch instructions have yet been executed, for example in the initial execution of a first program after reset. As will be apparent from the following description, this state also effectively corresponds to that in which a loop has been exited and will not be re-entered. The following description of the operation of loop cache 62' will be presented for an exemplary sequence that includes the loading of branch cache register file 176, followed by execution of instructions from branch cache register file 176.

In process 184, a new fetch address is received by loop cache 62' from instruction fetch unit 10 of central processing unit 3. As shown in FIG. 7, this new fetch address is received by next candidate address register 168 (but not yet loaded thereinto), by one input of comparator 172, and by backward branch detection logic 178 and sequential fetch detection logic 180 (in this example where central processing unit 3 itself does not generate the backward branch and sequential fetch control signals on lines BW and SEQ, respectively).

Loop cache 62' next performs decision 185 through the operation of backward branch detection logic 178, or alternatively by receiving a signal on line BW from central processing unit 3, to determine whether the current fetch address represents a backward branch. If not (decision 185 is NO), as indicated by an inactive signal on line BW that is received by loop cache control logic 174, control passes to decision 187. Comparator 172 compares the current fetch address to the current contents of base address register 170, and asserts an active signal on line EQF if the two addresses are equal. Loop cache control logic 174 interrogates the state of line EQF from comparator 172, as well as the state of the valid bit associated with entry 0 in register 175. If either line EQF is inactive or the valid bit for entry 0 is clear (decision 187 is NO), the current fetch address does not correspond to the base address of branch cache register file 176 for which the contents thereof are valid. Control, in this case, then passes to decision 189.

As noted above, sequential fetch detection logic 180 receives the current fetch address and determines whether this fetch address is sequential to the previous fetch address, asserting line SEQ if such is the case. Decision 189 is performed by loop cache control logic 174 interrogating the state of line SEQ from sequential fetch detection logic 180 (or from central processing unit 3, if generated thereby), and by interrogating the state of flag LFLAG and the contents of index register 182. If the current fetch address is not a sequential fetch (line SEQ is inactive), or flag LFLAG is clear, or the contents of index register 182 are greater than or equal to the capacity N of branch cache register file 176, decision 189 returns a NO result. This corresponds to the event of a cache miss of loop cache 62'. Process 190 is then performed, by loop cache control logic 174 enabling a read of L1I data RAM 60 via an active signal on line RD; loop cache control logic 174 also causes multiplexer 64 to use the output of L1I data RAM 60 as the fetched opcode, by issuing the appropriate signal on line SEL. Loop cache control logic 174 clears flag LFLAG 177, indicating that the last fetch address corresponded to a miss. Control then passes back to process 184 for receipt of the next fetch address.

Upon receipt of a fetch address that is a backward branch (decision 185 is YES), loop cache control logic 174 then executes decision 191 to determine whether the current fetch address equals the contents of base address 170, and if the valid bit in register 175 is set for the index value of 0 (i.e., the base address). If either of these conditions is not met (i.e., decision 191 is NO), control passes to decision 193. By way of explanation, as noted above, the loop tail cache technique embodied by loop cache 62' according to this second preferred embodiment of the present invention effectively loads branch cache register file 176 only upon the second pass through a loop. In the method of operation shown in FIG. 8, decision 191 returns a NO result for each of the first and second instances of the backward branch determined by decision 185 and, as will be apparent from the following description, returns a YES result for third and subsequent instances of this backward branch.

Figure 8:
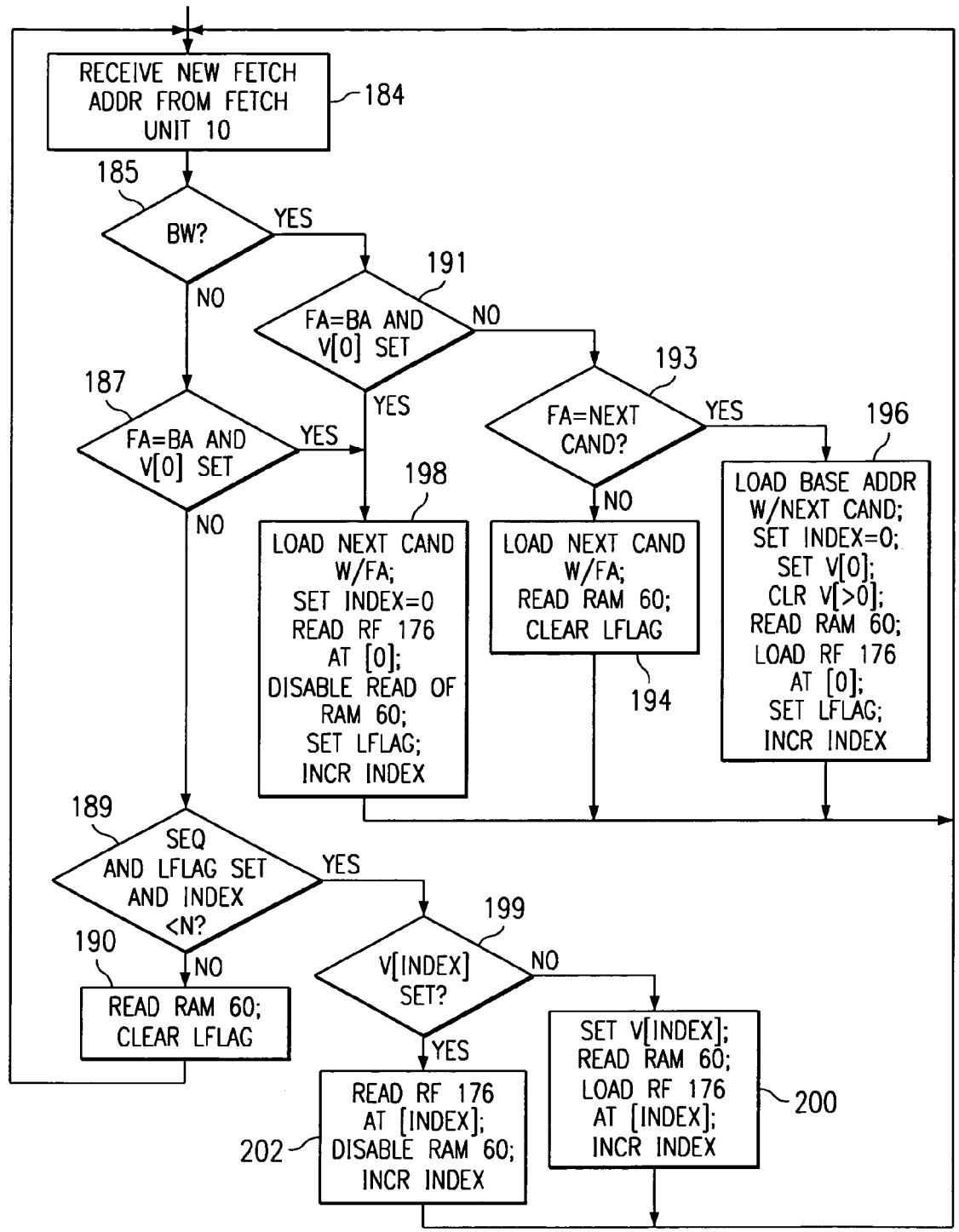
FIG. 8 is a flow diagram illustrating the operation of the loop cache of FIG. 7, according to the second preferred embodiment of the invention.

Referring to FIG. 7, comparator 173 compares the contents of next candidate address register 168 with the current fetch address, issuing an active signal on line EQN when the two values are equal. The state of line EQN is interrogated by loop cache control logic 174 in decision 193 (FIG. 8). In the event that the backward branch represented by the current fetch address is being taken for the first instance, the current fetch address will not equal the content of next candidate address register 168, and decision 193 will therefore return a NO result. Control then passes to process 194, in which loop cache control logic 174 causes next candidate address register 168 to store the current fetch address; this effectively establishes the current fetch address as a candidate for possible storage of its sequence in branch cache register file 176 (if the loop is executed a second time). The instruction opcode for the current fetch address is enabled to be read from L1I data RAM 60 and applied to fetch unit 10, by assertion of signals on lines RD and SEL, and flag LFLAG is also cleared, both in process 194. Control then again passes to process 184 to await the next fetch address.

To the extent that intervening addresses following the candidate fetch address are fetched in sequence, the fetches will continue to be made from L1I data RAM 60 (via process 190). Upon the receipt of the second consecutive instance of a backward branch (decision 185 is YES), for which the fetch address does not yet equal the base address (decision 191 is NO) but does equal the contents of next candidate address register 168, comparator 173 will issue an active signal on line EQN, in which case decision 193 will return a YES result. Control then passes to process 196, in which loop cache control logic 174 responds to the fetch of the second instance of this backward branch. Of course, if a different backward branch were to have been detected between the time of the first and second instances of a backward branch, the second instance would be treated as though it were a first instance (decision 193 returning a NO), as the intervening backward branch fetch address would be stored in next candidate address register 168.

In process 196, loop cache control logic 174 causes the current fetch address, which equals the contents of next candidate address register 168, to be stored in base address register 170. Loop cache control logic 174 also issues an active signal on line LD0, resetting the contents of index register 182 to zero (and applying a zero index value to the address input of branch cache register file 176). In register 175, the valid bit for entr y 0 is set (as its contents will be written with the correct opcode), and the valid bits for all other entries cleared. The memory location corresponding to the current fetch address in L1I data RAM 60 is read (line RD active), and its contents applied to the data input of branch cache register file 176 along with a read control signal at control input R/W, storing this opcode into the 0th entry of branch cache register file 176. Loop cache control logic 174 causes multiplexer 64 to use the output of L1I data RAM 60 as the fetched opcode, by issuing the appropriate signal on line SEL. Flag LFLAG is set, indicating that this loop will now correspond to a hit of loop cache 62'. Adder 183 then increments the contents of index register 182 in preparation for the next fetch address in process 184.

Upon the receipt of the fetch addresses for sequential instructions to the twice-received backward branch (i.e., for those instructions within the loop), decisions 185 and 187 will return NO results (as these addresses are in sequence, but are not the address 1*d* currently stored in base address register 170, which is the backward branch address). However, because these fetch addresses in the loop are in sequence (line SEQ active) with flag LFLAG set (from process 196), and so long as the fetch address is within the capacity of branch cache register file 176 (the contents of index register 182 being less than N), decision 189 will return a YES result. Loop cache control logic 174 will then interrogate the valid bit of register 175 corresponding to the current index value, in decision 199, to determine if the corresponding entry of branch cache register file 176 contains the valid opcode for the current fetch address. If not (decision 199 is NO), such as is the case for this second pass through the loop, control passes to process 200, in which the valid bit in register 175 for the current index value is set; the contents of L1I data RAM 60 corresponding to the current fetch address are read (line RD active), applied to central processing unit 3 (line SEL causing multiplexer 64 to select L1I data RAM 60), and loaded into the corresponding entry of branch cache register file 176. Index register 182 is then incremented by adder 183, in preparation for the next fetch address received in process 184.

This sequence is then repeated for the remainder of the loop, loading branch cache register file 176 with opcodes until the loop is exited by a non-sequential fetch or by the loop length exceeding the capacity of branch cache register file 176 (i.e., decision 189 being NO), or until a backward branch instruction is detected (decision 185 is YES). Upon detection of a backward branch, and where the detected branch is the same backward branch as that for which the loop is stored in branch cache register file 176, as determined by the current fetch address equaling the contents of base address register 170 for valid bit 0 set, decision 191 returns a YES result. Control then passes to process 198, in which next candidate address register 168 loads (or reloads, as the case may be) the current fetch address value; this operation precludes the reloading of branch cache register file 176 except for two successive different backward branches. Additionally, since the current backward branch is again beginning at the top, index register 182 is reset to zero, to provide the correct address to branch cache register file 176 for the fetch at the top of the loop. This 0th entry of branch cache register file 176 is then read, by assertion of a read control signal at control input R/W, and its output applied to multiplexer 64 and selected under the control of a signal on line SEL from loop cache control logic 174. To save power consumption, loop cache control logic 174 disables the read operation of L1I data RAM 60, by deasserting line RD; additionally, if desired, a similar disable signal may be applied to L1I tag RAM 54 to save additional power by preventing reads thereto. Process 174 completes with flag LFLAG being set (if not already set), and adder 183 incrementing the contents of index register 182 in preparation for the next fetch address, received in process 184.

Successive fetches of the instructions in the stored loop may then be made from branch cache register file 176, rather than from L1I data RAM 60. As these fetches are not backward branches (decision 185 is NO) and are not from the top of the loop (decision 187 is NO), but are sequential fetches with flag LFLAG set, decision 189 will return a YES result so long as the fetch is within the capacity of branch cache register file 176. Since branch cache register file 176 is loaded with these instructions, for which the valid bit in register 175 is set, decision 199 returns a YES result and control passes to process 202. In this event, loop cache control logic 174 effects a read of the opcode from branch cache register file 176 from the entry corresponding to the current contents of index register 182, while disabling L1I data RAM 60 from performing the read; multiplexer 64 is also controlled to select the output of branch cache register file 176 for application of the opcode to central processing unit 3. The contents of index register 182 are again incremented, awaiting the next fetch address in process 184.

The operation of loop cache 62' according to this second preferred embodiment of the invention also permits the fetch of instructions from branch cache register file 176 in the event that a loop has been executed at least twice, but is then next entered in a sequential manner (and not from a backward branch, but rather from decision 185 returning a NO result). This occurs by operation of decision 187 which, for any instruction of a fetch address equal to the contents of base address register 170 for which the valid bit in register 175 for entry 0 is set, transfers control to process 198, to effect the fetch of the opcode from branch cache register file 176 even though the loop is not entered from a backward branch. Operation continues from this point forward in the manner described above.

As in the case of loop cache 62 according to the first preferred embodiment of the invention, the operation of loop cache 62' according to this second preferred embodiment of the invention provides significant advantages in the operation of a programmable logic device, such as a digital signal processor or microprocessor. In particular, it is contemplated that significant power reduction is obtained in the execution of loops, in that the opcode fetches may be made from a register file rather than from a higher level cache memory. Further, the register file containing the opcodes is only loaded when appropriate, and no special repeat block instruction is required.

Furthermore, the loop tail cache according to this second preferred embodiment of the invention reduces the possibility of "thrashing" (i.e., the repeated and inefficient reloading of the loop cache) that can occur according to the loop front cache approach of the first preferred embodiment of the invention; additionally, the branch cache register file is not loaded with opcodes for loops that are only executed once. Of course, the loop tail cache requires an additional pass through the loop in order to load the branch cache register file, but it is contemplated that many code sequences, particularly those performed by DSPs, utilize loops that are executed many times, and as such this additional pass is not contemplated to significantly limit the benefit of the present invention.

The present invention is therefore contemplated to provide important power savings in programmable devices. By way of simulation according to a set of DSP benchmarks, for example, it is contemplated that the hit rates for thirty-two cache line entry register files according to the loop front cache may average on the order of 85%, while hit rates for the loop tail cache may average on the order of 80%; the loop tail cache was found to have higher hit rates for smaller register files.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. An instruction-programmable processor, comprising:
a program memory for storing instruction opcodes;
a central processing unit, including one or more execution units for executing data processing instructions, and including an instruction fetch unit for presenting a fetch address to the program memory for fetching therefrom an instruction opcode corresponding to the fetch address; and
a loop cache, coupled to the instruction fetch unit, and comprising:
a base address register, for storing a base fetch address;
a branch cache register file, having a plurality of storage locations for storing instruction codes corresponding to a sequence of fetch addresses beginning with the base fetch address, having a data input coupled to the output of the program memory, and having a data output;
a multiplexer, having a first input coupled to an output of the program memory, having a second input coupled to the data output of the branch cache register file, having a select input, and having an output coupled to the instruction fetch unit of the central processing unit; and
loop cache control logic, having a first control output coupled to a control input of the program memory, having a second control output coupled to the select input of the multiplexer, and having a third control output coupled to the branch cache register file for controlling writes thereto and reads therefrom, the loop cache control logic for controlling the multiplexer to select the output of the branch cache register file and for disabling a read of the program memory, responsive to the fetch address corresponding to one of the instruction codes stored in the branch cache register file;
wherein the loop cache control logic also has an input for receiving a backward branch signal indicating that a fetch address corresponds to a backward branch, the loop cache control logic also for controlling the branch cache register file to load an instruction code received at its data input from the program memory responsive to receiving a backward branch signal in combination with the fetch address not corresponding to one of the instruction codes stored in the branch cache register file.

2. The processor of claim 1, further comprising:
backward branch detection logic, comprising a last fetch register for storing a previous fetch address and a comparator for comparing a current fetch address to the contents of the last fetch register, the comparator having an output for generating the backward branch signal responsive to the current fetch address being less than or equal to the previous fetch address.

3. The processor of claim 1, further comprising:
an index comparator, having a first input coupled to the base address register, having a second input coupled to the instruction fetch unit to receive the fetch address therefrom, and having an output coupled to an address input of the branch cache register file and to the loop cache control logic, for presenting an index value corresponding to a difference between the fetch address and the base fetch address.

4. The processor of claim 3, further comprising:
a valid bit register, comprising a plurality of bit locations, each associated with one of the storage locations of the branch cache register file, each for indicating whether the contents of its associated storage location of the branch cache register file contains a valid instruction code.

5. The processor of claim 1, further comprising:
a next candidate register, for storing a fetch address responsive to the loop cache control logic receiving a backward branch signal in combination with the fetch address not corresponding to one of the instruction codes stored in the branch cache register file;
wherein the base address register is coupled to the next candidate register, and is for loading the contents of the next candidate register as a base fetch address responsive to the loop cache control logic receiving a backward branch signal in combination with the fetch address corresponding to the contents of the next candidate register;
and wherein the loop cache control logic is for controlling the branch cache register file to load an instruction code received at its data input from the program memory responsive to receiving a backward branch signal in combination with the fetch address corresponding to the contents of the next candidate register.

6. The processor of claim 5, further comprising:

an index register; having an output coupled to an address input of the branch cache register file, and coupled to an incrementer for incrementing the contents of the index register upon the loop cache receiving each fetch address;

a valid bit register, comprising a plurality of bit locations, each associated with one of the storage locations of the branch cache register file, each for indicating whether the contents of its associated storage location of the branch cache register file contains a valid instruction code;

wherein the loop cache control logic also has an input for receiving a sequential fetch signal indicating that the fetch address from the instruction fetch unit is in sequence with a previous fetch address;

and wherein the loop cache control logic is for controlling the branch cache register file to load an instruction code received at its data input from the program memory, at a storage location indicated by the contents of the index register, responsive to receiving the sequential fetch signal and to the bit location of the valid bit register indicating that the storage location corresponding to the contents of the index register does not contain a valid instruction code.

7. The processor of claim 6, wherein the loop cache control logic is also for controlling the branch cache register file to present, at its output, the contents of a storage location indicated by the contents of the index register, responsive to receiving the sequential fetch signal and to the bit location of the valid bit register indicating that the storage location corresponding to the contents of the index register contains a valid instruction code.

8. The processor of claim 1, wherein the program memory comprises:
    a level one instruction memory, having a read control input coupled to the loop cache control logic, and having a data output coupled to the multiplexer;
    a level one tag memory, for storing tag addresses corresponding to memory locations for which the level one instruction memory stores instruction codes; and
    a level one tag comparator, having an input for receiving the fetch address from the fetch instruction unit, and having an input coupled to the level one tag memory, for comparing the fetch address to the tag addresses to determine whether the fetch address corresponds to a memory location for which the level one instruction memory stores a valid instruction code.

9. The processor of claim 8, wherein the program memory further comprises:
    a level two cache, coupled to the level one instruction memory, for storing instruction codes.

10. The processor of claim 9, wherein the program memory and the level two cache are located on the same integrated circuit as the central processing unit.

11. A method of fetching instructions for execution by one or more execution units in a central processing unit of an instruction-programmable processor, comprising:
    receiving a sequence of fetch addresses from an instruction fetch unit of the central processing unit;
    responsive to one of the received fetch addresses corresponding to a backward branch operation and not corresponding to valid contents of a loop cache, loading a base location of a branch cache register file with an instruction code corresponding to the fetch address from program memory, and setting a valid bit corresponding to the base location;
    then, responsive to receiving a fetch address following the backward branch operation and within a storage capacity of the branch cache register file, fetching the instruction code corresponding to the fetch address from program memory, loading the instruction code in a next indexed location of the branch cache register file, and setting a valid bit corresponding to the next indexed location; and
    then, responsive to receiving a fetch address corresponding to a location of the branch cache register file for which a corresponding valid bit is set:
        disabling the program memory from performing a read access; and
        forwarding the contents of the location of the corresponding branch cache register file to the central processing unit.

12. The method of claim 11, further comprising:
    after receiving a fetch address, comparing the received fetch address with the contents of a base address register to determine a difference value;
    responsive to the difference value being greater than a capacity of the branch cache register file, determining whether the received fetch address corresponds to a backward branch relative to a previous fetch address; and
    responsive to the determining step determining that the received fetch address corresponds to a backward branch, loading the received fetch address in the base address register;
    wherein the loading step is performed responsive to the determining step determining that the received fetch address corresponds to a backward branch.

13. The method of claim 12, wherein the determining step comprises:
    storing a previous fetch address in a previous fetch address register;
    comparing the received fetch address to the contents of the previous fetch address register to determine whether the received fetch address is less than the contents of the previous fetch address register.

14. The method of claim 11, further comprising:
    after receiving a fetch address, detecting whether the received fetch address corresponds to a backward branch relative to a previous fetch address;
    responsive to the detecting step detecting that the received fetch address corresponds to a backward branch, comparing the received fetch address with the contents of a candidate register;
    responsive to the comparing step determining that the received fetch address does not match the contents of the candidate register, loading the received fetch address in the candidate register;
    wherein the step of loading the base location of a branch cache register file is performed responsive to the comparing step detecting that the received fetch address matches the contents of the candidate register.

15. The method of claim 14, further comprising:
    responsive to the comparing step determining that the received fetch address matches the contents of the candidate register, setting an index register;

then, responsive to receiving a next fetch address, repeating the detecting step;

responsive to the detecting step detecting that the received fetch address does not correspond to a backward branch, determining whether the received fetch address corresponds to a sequential fetch; and responsive to determining that the received fetch address corresponds to a sequential fetch, testing a valid bit corresponding to the contents of the index register;

wherein the step of fetching the instruction code is performed responsive to the resulting of the testing step indicating that the valid bit corresponding to the contents of the index register is not set;

wherein the disabling and forwarding steps are performed responsive to the result of the testing step indicating that the valid bit corresponding to the contents of the index register is set;

and further comprising:

after either the forwarding or fetching steps, incrementing the index register.

16. The method of claim 15, further comprising:

responsive to determining that the received fetch address does not correspond to a sequential fetch, fetching the instruction code corresponding to the fetch address from program memory.

* * * * *